United States Patent Office 3,413,085
Patented Nov. 26, 1968

3,413,085
PROCESS FOR PREPARING CUPROUS
HALIDE SORBENTS
Warren Alfred Knarr, Baton Rouge, La., and Edward
Allen Hunter, Lake Jackson, Tex., assignors to Esso
Research and Engineering Company, a corporation of
Delaware
No Drawing. Filed Nov. 10, 1964, Ser. No. 410,276
12 Claims. (Cl. 23—97)

ABSTRACT OF THE DISCLOSURE

Cuprous halide sorbents suitable for use in selective olefin separation and recovery systems are prepared by first dissolving cuprous halide in a solvent containing less than about 0.4 wt. percent of a complexing agent, then treating the solution with less than the stoichiometric amount of a complexing agent to form an insoluble precipitate, recovering the precipitate and dissociating it to produce an active cuprous halide sorbent.

---

This invention is directed to the hydrocarbon system employed in preparing cuprous halide sorbents suitable for use in the selective separation and recovery of olefins or polyolefins, e.g., butadiene, from hydrocarbon streams containing said olefin(s), and the careful control of the hydrocarbon system thereof to enable the use of low cost hydrocarbon systems repeatedly on a commercial basis.

More specifically, the present invention is directed to a composite improved process for preparing cuprous halide sorbents suitable for use in olefin separation and recovery systems wherein the concentration of the complexing agent in the hydrocarbon solvent system during catalyst sorbent preparation and activation is controlled to be below 0.4 wt. percent even though utilizing a low cost hydrocarbon stream containing in excess of 0.4 wt. percent complexing agent as a major component of said hydrocarbon solvent system. This low cost hydrocarbon stream can be recycled through the hydrocarbon system for repeated use over extended periods in a given sorbent activation system.

In the preparation of the cuprous halide sorbents, the cuprous halide salt, e.g., cuprous chloride, is first dissolved in a suitable hydrocarbon solvent, e.g., butene-1, isobutylene, etc., to form a cuprous halide solution. Then this solution is contacted with a complexing agent, viz, a compound having a functional group capable of forming a stable complex having a mole ratio of copper to complexing compound greater than 1:1, e.g., a diolefin. Usually, it is desired to use a complexing agent, e.g. butadiene, which forms an insoluble complex in the solvent used to dissolve the cuprous halide salt. The cuprous chloride is then activated for use by heating to remove the complexing moiety, and can then be used directly for selectively sorbing olefins, especially diolefins, from hydrocarbon streams containing them.

Prior to the present invention, in forming the cuprous chloridebutadiene complex, it was customary to add the butadiene in gaseous form. It was also customary to use an excess of butadiene to insure that all of the cuprous halide in solution was complexed. It was considered necessary to use an excess of gaseous butadiene since it was fairly difficult to meter the proper molar amount of gaseous butadiene, viz, one mole per two moles of cuprous halide salt in solution. Hence, to insure that the requisite molar amount was present, an excess was supplied.

The use of excess amounts of butadiene in the complexing step created severe problems when attempts were made to recycle the hydrocarbon solvent(s) after removal of the insoluble cuprous halide-butadiene complex therefrom for use again to dissolve more cuprous halide salt. The main problem presented was the premature precipitation of insoluble cuprous halide-butadiene complex during the dissolving step due to the presence in the recycled hydrocarbon solvent of even small amounts of butadiene complexing agent dissolved therein. This caused CuCl to be lost as the complex when the solution was filtered prior to being charged to the precipitation vessel. Also, it was noted that even small amounts, e.g. 0.5 to 2 wt. percent, of butadiene inhibited the ability of the recycled hydrocarbon system (usually butene-1 or isobutylene) to dissolve sufficient amounts of cuprous halide salt even though the same conditions of temperature, pressure, etc., were used in the dissolving tank in conjunction with the recycled hydrocarbon solvent as were employed at the outset of the process.

In view of these vexing problems, it was customary procedure either to dispose of the used solvent to refinery slop, or use comparatively expensive solvent purification procedures, e.g. molecular sieving, to remove butadiene selectively from the hydrocarbon solvent before recycling it to the dissolving step. Such was the prior art background prior to the development of the present invention.

The present invention constitutes a very effective, inexpensive and commercially feasible solution to the problems involved in the hydrocarbon solvent system employed in selective olefin separation and recovery processes based on cuprous halide sorbents. It has now been discovered that the hydrocarbon solvent initially used to dissolve the cuprous halide salt can be recycled from the complexing step back to the dissolving step without the necessity of expensive, intermediate molecular sieving (or other repurification steps), by limiting the butadiene concentration in the recycle solvent so that it will not exceed approximately 0.4 wt. percent. The hydrocarbon solvent can then be recycled directly for reuse in the dissolving step without intermediate expensive purification and without complex forming in the dissolver. This is readily accomplished by using stoichiometric or less amounts of butadiene to accomplish complexing. In accordance with this invention it is usually desirable to employ in the complexing step from about 70 to about 99.5 percent of the theoretical stoichiometric amount of butadiene required for complex formation. Usually the butadiene concentration ranges from about 85 to 99.5 percent of the theoretical requirements, and preferably from 90 to 99 percent of the theoretical stoichiometric amount of butadiene is used.

It has been further discovered with regard to the dissolving step that the solubility of cuprous chloride in butene-1 (as high as 51.2 wt. percent or even higher) is much higher than the solubility of cuprous chloride in isobutylene (maximum 9.3 wt. percent). In addition, the high solubility of cuprous chloride in butene-1 extends over a very broad temperature range, approximately 37.8 wt. percent at $-43°$ F. to 51.2 wt. percent at $+15°$ F., versus a very limited temperature range for maximum cuprous chloride dissolved in isobutylene, approximately 8 wt. percent between temperatures of $-5°$ F. to $+8°$ F.

Unfortunately, essentially pure butene-1 is expensive, and essentially pure butene-1 streams are not available on a commercial basis in petroleum refineries. However, several low cost petroleum $C_4$ olefin-containing refinery streams containing significant amounts of butene-1, e.g., 25+ wt. percent of butene-1, are readily available on a commercial basis; but these same $C_4$ olefin streams also contain what was at first presumed to be prohibitively high amounts of butadiene, viz, 1.5+ wt. percent, for use in a recycled hydrocarbon solvent system in the preparation of cuprous halide sorbents for use in olefin separation processes. The apparent necessity to subject these low cost, readily available $C_4$ olefin streams to preliminary and expensive purification procedures, e.g., molecular sieving, etc., rendered their use in the hydrocarbon solvent system of cuprous halide-based olefin separation recovery systems very unattractive financially. This was thought to be the case because the savings derived from the use of the low cost readily available $C_4$ olefin streams would be practically offset by the expense of the butadiene removal purification treatment.

Then it was discovered that these same $C_4$ olefin refinery streams could be employed as make-up solvent or the sole hydrocarbon solvent in a solvent recycle process without exceeding the maximum 0.4 wt. percent butadiene level by passing the $C_4$ olefin stream to the complexing step before its use in the dissolving step. This critical sequential embodiment of the present invention enables utilization of low cost, readily available, commercially produced $C_4$ olefin refinery streams containing significant amounts of butene-1 where such streams could not be employed previously without expensive purification steps.

In addition to this economic advantage, several other advantages are attendant to the use of these $C_4$ olefin streams in the hydrocarbon solvent system of cuprous halide sorbent based separation and recovery processes. According to a preferred embodiment of this invention, insufficient gaseous butadiene is fed to the complexing step to constitute the entire amount necessary for complexing in the manner referred to hereinabove. The remaining portion of the butadiene is fed in liquid form by first passing the $C_4$ olefin stream, containing both butene-1 and butadiene, to the complexing step to constitute the remaining 0.5 to 30 percent of butadiene fed to the complexing step. This has the added advantage of enabling close control over the total amount of butadiene present in the complexing tank, due to the fact that it is much easier to obtain closer control when metering butadiene in liquid form than in gaseous form. The butadiene present in the $C_4$ olefin stream is in liquid form since it is dissolved therein.

Another advantage of the present invention is that each succeeding run, using the low cost $C_4$ olefin solvent streams containing significant amounts of butene-1, will increase the concentration of butene-1 in the hydrocarbon solvent system without the necessity of using essentially pure butene-1, which is far more costly. Moreover, if one is willing to lose some cuprous chloride initially, the entire system can be started using the $C_4$ olefin streams as sole hydrocarbon solvent.

Suitable low cost, commercially available, $C_4$ olefin petroleum streams which contain significant amounts of butene-1 and can be employed in the present invention to constitute the make-up solvent or entire solvent and make-up butadiene in cuprous halide-based olefin separation recovery processes include, for example, light cuts of steam-cracked olefins derived from wax, petrolatum, light naphthas, gas oil, etc. These $C_4$ olefin streams usually are predominantly monoolefinic and contain the following components.

| Components | Varying concentrations (wt. percent) | Usual concentrations (wt. percent) | Preferred concentrations (wt. percent) |
|---|---|---|---|
| $C_3$'s | 1-25 | 1-5 | 2 |
| Butane and isobutane | 1-25 | 2-10 | 4 |
| Butene-1 | 5-90 | 20-75 | 36 |
| Butene-2 | 5-50 | 6-25 | 16 |
| Isobutylene | 5-90 | 20-75 | 39 |
| Butadiene | 1-25 | 1-5 | 3 |

According to the present invention, these low cost, commercially available $C_4$ olefin streams, containing both significant amounts of butene-1 and lesser amounts of butadiene, can be used to supply part or all of the butadiene requirements in the complexing step.

The present invention can be employed in olefin separation and recovery processes based upon various cuprous halide sorbents, e.g., cuprous chloride, cuprous bromide, and cuprous iodide. Moreover, the present invention is applicable when complexes other than butadiene complexes with the above mentioned cuprous halide salts are employed in the processes, viz, when cuprous halide complexes containing various complexing ligands (carbon containing functional groups capable of forming stable complexes having a mole ratio of copper to complexing compound greater than 1:1 with cuprous halide salts). Thus the advantages of the present invention likewise apply when the complexing ligands (complex-forming moieties) are butadiene, acetylene, substituted acetylenes piperylene, acetonitrile, allene, acrylonitrile, HCN, carbon monoxide, and other diolefins, amines, nitriles, etc.

This invention will be illustrated in greater detail by the examples which follow.

EXAMPLE 1

In the first cycle two liters of isobutylene were added to a four-liter resin flask. To this flask was added 121 grams of high purity cuprous chloride. Solution of the cuprous chloride was accomplished by stirring at 0° F. for 60 minutes. Stirring was then discontinued and 1500 ml. of clarified liquor was transferred to the precipitator flask. An analysis of the solution transferred revealed the solution contained 4.8 wt. percent cuprous chloride and no butadiene. In this first cycle 0.9 of an equivalent of butadiene was added over a one-hour period at 0° F. while stirring to reduce the cuprous chloride concentration to 3.3 wt. percent and making the butadiene concentration 0.15 wt. percent. No effort was made to remove the precipitated complex from the precipitation flask. 1000 ml. of the liquor from the precipitator was recycled to the dissolver.

For the second cycle is was necessary to add 1000 ml. of isobutylene to increase the liquor in the dissolver to 2000 ml. Again 121 grams of cuprous chloride was added to the dissolver. This time stirring was carried out for 133 minutes to assure more complete solution of the cuprous chloride. Stirring was discontinued and 1600 ml. of solution was transferred to the precipitator. This time the liquor contained 9.3 wt. percent cuprous chloride. Again 0.9 of an equivalent butadiene was added while stirring to reduce the cuprous chloride concentration to 0.9 wt. percent and make the final butadiene concentration 0.23 wt. percent. Again the precipitated complex was left in the flask along with the precipitated complex from the first cycle while 1500 ml. of liquor was recycled to the dissolving flask.

For the third cycle only 99 g. of cuprous chloride was added to the undissolved cuprous chloride already present in the flask. This time 167 minutes of stirring were employed to achieve the solution. Summarizing this third cycle 1500 ml. liquor were transferred, 9.1 wt. percent cuprous chloride in solution before butadiene added, 0.57 wt. percent final cuprous chloride, and 0.34 wt. percent butadiene.

The precipitated complex was dried and found to consist of 273 g. of cuprous chloride with the following particle size distribution.

|  | wt. percent |
|---|---|
| 0–10$\mu$ | 2.40 |
| 10–20$\mu$ | 2.30 |
| 20–50$\mu$ | 10.70 |
| 50–80$\mu$ | 9.30 |
| 80–110$\mu$ | 1.40 |
| 110+$\mu$ | 73.90 |

The undissolved material in the dissolver was examined and found to be cuprous chloride and no complex could be detected.

EXAMPLE 2

This example is similar to the preceding example except that a refinery $C_4$ stream was used for the make up liquor. This stream had the following analysis.

| | Percent |
|---|---|
| $C_3$'s | 2 |
| Butane and isobutane | 4 |
| Butene-1 | 36 |
| Butene-2 | 16 |
| Isobutylene | 39 |
| Butadiene | 3 |

In the first cycle 2000 ml. of isobutylene were used in the dissolver along with 121 grams of cuprous chloride to prepare a 9.1 wt. percent solution. 1500 ml. of this solution was transferred to the precipitator. At this point 500 ml. of a $C_4$ stream of the above composition was added. Additional butadiene was then added to the precipitator until the concentration of cuprous chloride was reduced to 0.9 wt. percent and the butadiene concentration was 0.28 wt. percent. No attempt was made to remove the precipitated complex, and 1500 ml. of clarified liquor was returned to the dissolver.

In the second cycle 170 g. of cuprous chloride was added to the dissolver. This time a 10.2 wt. percent solution of cuprous chloride was obtained after stirring for 120 minutes. The stirring was discontinued and 1500 ml. of clarified liquor was transferred to the precipitator. Again 500 ml. of make up liquor of refinery $C_4$'s was added while stirring and this was followed by the addition of butadiene. The final cuprous chloride concentration in solution was 1.6 wt. percent and the butadiene concentration was 0.214 wt. percent. The precipitated complex was of the desired particle size.

EXAMPLE 3

This example is similar to Example 2 except that rather than use isobutylene for the start-up liquor a refinery $C_4$ stream was used having the following analysis:

| | Percent |
|---|---|
| $C_3$'s | 2 |
| Butane and isobutane | 4 |
| Butene-1 | 36 |
| Butene-2 | 16 |
| Isobutylene | 39 |
| Butadiene | 3 |

2000 ml. of this $C_4$ stream were charged to the dissolver flask along with 264 g. of CuCl. Stirring at 0° F. was carried out for 2 hours to accomplish solution of the cuprous chloride. At the end of this time, the solution consisted of 6.5 wt. percent cuprous chloride and 0.3 wt. percent butadiene. 1500 ml. of this clarified liquor was transferred to the precipitator. In anticipation of the need for make-up liquor 500 ml. of $C_4$'s were gradually added to the precipitator while stirring at 0° F. Following this sufficient butadiene was added over a one-hour period to reduce the cuprous chloride concentration in solution to 0.8 wt. percent and 0.32 wt. percent of butadiene.

Stirring was discontinued and 1500 cc. of liquor was returned to the dissolver for reuse. In the second cycle 170 g. of cuprous chloride was added to the dissolver and stirring for 2 hours at 0° F. was utilized to dissolve the cuprous chloride and the resulting solution contained 10.3 wt. percent cuprous chloride. 1500 ml. of this liquor was transferred to the precipitator and sufficient butadiene was added to reduce the cuprous chloride concentration to 0.5 wt. percent. The precipitated complex was dried and found to be of the desired particle size.

What is claimed is:

1. A process for preparing a cuprous halide sorbent suitable for use in selective olefin separation and recovery systems which comprises
    (a) dissolving cuprous halide in a predominantly monoolefinic hydrocarbon solvent containing no more than about 0.4 wt. percent butadiene, thereby forming a cuprous halide solution,
    (b) then contacting in a separate stage the cuprous halide solution with from about 70 to about 99.5% of the theoretical stoichiometric amount of butadiene required for complex formation, thereby precipitating a cuprous halide-butadiene complex,
    (c) separating the cuprous halide-butadiene complex from the solvent, and
    (d) heating the cuprous halide-butadiene complex to separate the complexing moiety and thereby forming a cuprous halide sorbent suitable for use in selective olefin separation and recovery systems.

2. The process of claim 1 wherein the solvent, which contains no more than about 0.4 wt. percent butadiene, is recycled to the dissolving step.

3. A process for preparing a cuprous chloride sorbent suitable for use in selective olefin separation and recovery systems which comprises
    (a) dissolving cuprous chloride in a predominantly monoolefinic $C_4$ hydrocarbon solvent mixture containing no more than about 0.4 wt. percent concentration of butadiene, thereby forming a cuprous chloride solution,
    (b) then contacting in a separate stage the cuprous chloride solution with gaseous butadiene using gaseous butadiene in concentrations ranging from about 70 to about 99.5% of the theoretical stoichiometric amount of butadiene required for complex formation, thereby precipitating a cuprous chloride-butadiene complex,
    (c) separating the cuprous chloride-butadiene complex from the solvent, and
    (d) heating the cuprous chloride-butadiene complex to separate the complexing moiety and thereby forming a cuprous chloride sorbent suitable for use in selective olefin separation and recovery systems.

4. The process of claim 3 wherein the solvent, which contains no more than about 0.4 wt. percent butadiene, is recycled to the dissolving step.

5. A process for preparing cuprous halide sorbents suitable for use in selective olefin separation and recovery systems which comprises
    (a) dissolving cuprous halide in a predominantly monoolefinic solvent containing no more than about 0.4 wt. percent of a complexing agent capable of forming a stable complex with the cuprous halide, said complex having a mole ratio of copper to complexing moiety greater than 1:1, thereby forming a cuprous halide solution,
    (b) then contacting in a separate stage the cuprous halide solution with from about 70 to about 99.5% of the theoretical stoichiometric amount required to form a stable complex with cuprous halide of a complexing agent, said complex having a mole ratio of copper to complexing moiety greater than 1:1, thereby precipitating a complex of said cuprous halide and said complexing agent,
    (c) separating the cuprous halide-complexing agent complex from the solvent, and
    (d) heating the cuprous halide-complexing agent complex to separate the complexing moiety and thereby forming a cuprous halide sorbent suitable for use in selective olefin separation and recovery systems.

6. The process of claim 5 wherein the solvent, which contains no more than 0.4 wt. percent of complexing agent, is recycled to the dissolving step.

7. A process for preparing a cuprous chloride sorbent suitable for use in selective olefin separation and recovery systems which comprises
    (a) dissolving cuprous chloride in a predominantly monoolefinic $C_4$ hydrocarbon solvent mixture containing no more than about 0.4 wt. percent butadiene, thereby forming a cuprous chloride solution, (b) then contacting in a separate stage the cuprous chloride solution with from about 70 to about 99.5% of the theoretical stoichiometric amount of butadiene required for complex formation, thereby precipitating a cuprous chloride-butadiene complex, (c) separating the cuprous chloride-butadiene complex from the solvent, (d) recycling the solvent which contains no more than about 0.4 wt. percent butadiene, to the dissolving step, and (e) heating the cuprous chloride-butadiene complex to separate the complexing moiety and thereby forming a cuprous chloride sorbent suitable for use in selective olefin separation and recovery systems.

8. A process as in claim 1 wherein from about 90 to 99 percent of said theoretical stoichiometric amount of butadiene is employed.

9. A process as in claim 1 wherein at least a portion of said hydrocarbon solvent employed in said dissolving step is obtained from a counterpart solvent containing substantially in excess of 0.4 wt. percent butadiene by contacting said counterpart with a cuprous halide solution to remove excess butadiene from said counterpart by complex formation with cuprous halide.

10. A process as in claim 9 wherein said counterpart solvent is a $C_4$ olefinic refinery stream containing from about 20 to about 75 wt. percent butene-1 and from about 1 to about 5 wt. percent butadiene.

11. A process as in claim 1 wherein said cuprous halide is cuprous chloride.

12. A process as in claim 10 wherein said counterpart $C_4$ olefinic refinery stream has the below indicated compositional constitution, the sum of components totalling 100 wt. percent for any given composition:

| Components: | Concentration (wt. percent) |
|---|---|
| $C_3$'s | 1–5 |
| Butane and isobutane | 2–10 |
| Butene-1 | 20–75 |
| Butene-2 | 6–25 |
| Isobutylene | 20–75 |
| Butadiene | 1–5 |

References Cited

UNITED STATES PATENTS

| | | | |
|---|---|---|---|
| 2,386,300 | 10/1945 | Drennan et al. | 260—681.5 |
| 2,386,355 | 10/1945 | Schulze et al. | 260—681.5 |
| 2,386,356 | 10/1945 | Schulze et al. | 260—438.1 |

TOBIAS E. LEVOW, *Primary Examiner.*

H. M. S. SNEED, *Assistant Examiner.*